May 1, 1945. J. O. OLSEN 2,374,774
MACHINE TOOL
Filed July 2, 1942 2 Sheets-Sheet 1
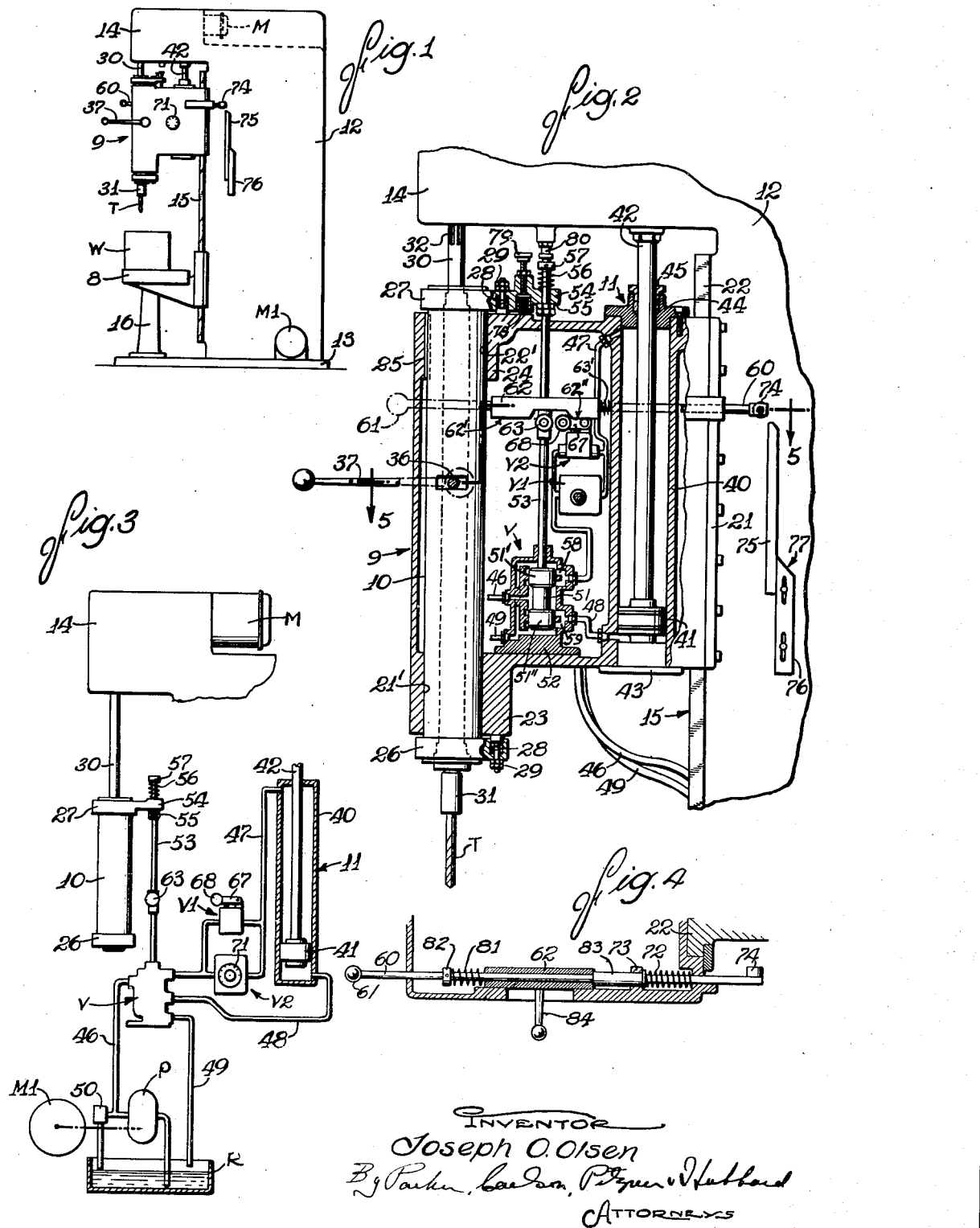
INVENTOR
Joseph O. Olsen
By Parker, Carlson, Pitzner & Hubbard
ATTORNEYS May 1, 1945.  J. O. OLSEN  2,374,774
MACHINE TOOL
Filed July 2, 1942  2 Sheets-Sheet 2
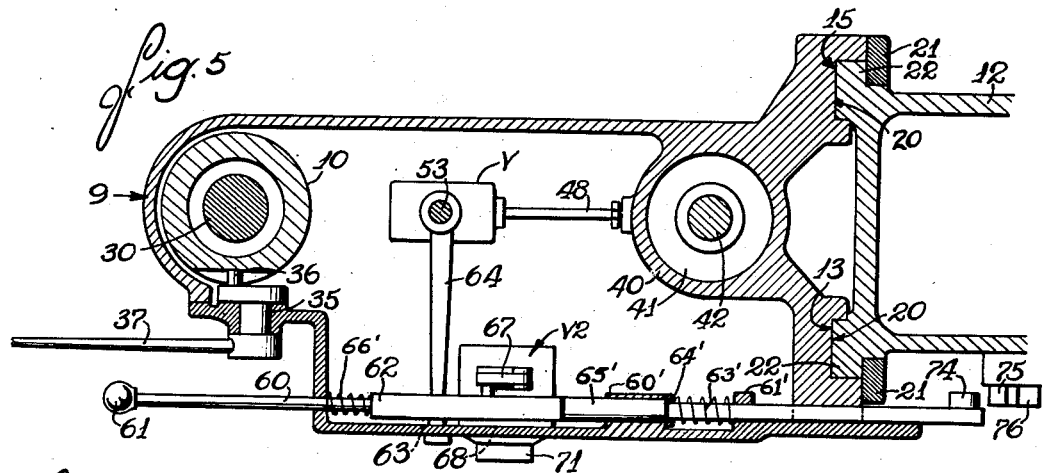
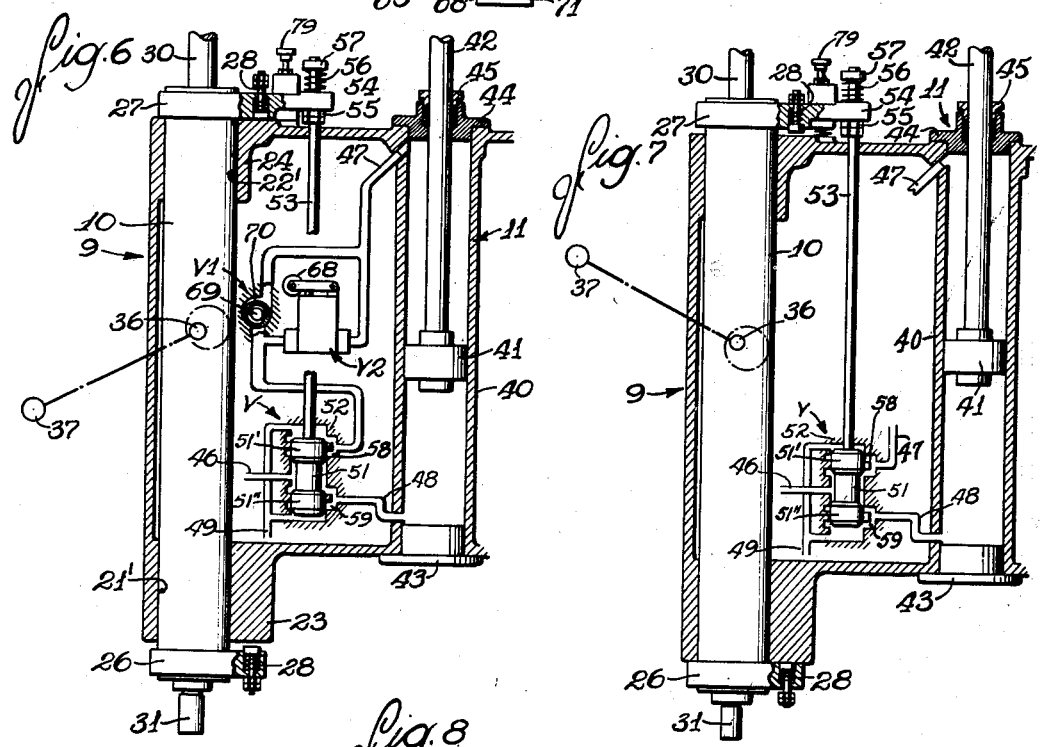
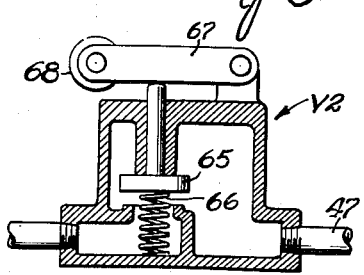
INVENTOR
Joseph O. Olsen
ATTORNEYS Patented May 1, 1945

2,374,774

UNITED STATES PATENT OFFICE 2,374,774

MACHINE TOOL

Joseph O. Olsen, Rockford, Ill., assignor to Barnes Drill Co., Rockford, Ill., a corporation of Illinois Application July 2, 1942, Serial No. 449,429

23 Claims. (Cl. 77—32)

The invention relates to drilling machines and similar machine tools and its primary object is to provide an improved machine tool of this general character well suited for heavy-duty production work yet having an extremely sensitive feed which adapts it for machine operations requiring the delicacy of touch obtainable only by hand control.

Another object is to provide an improved drilling machine adapted for either hand or power feed.

A further object is to provide an improved drilling machine of the quill type embodying novel power and control mechanisms for causing the head to follow the movements of the quill so that relatively little manual effort is required to feed the tool to the work and the extent to which the quill is projected from the head during the operation of the machine is limited to a very small range thus insuring a high degree of accuracy under all operating conditions.

Other objects and advantages of the invention will become apparent from the following detailed description of the preferred embodiment illustrated in the accompanying drawings in which:

Figure 1 is a side elevational view of a drilling machine embodying the features of the invention.

Fig. 2 is a vertical sectional view of the tool head showing details of the feed and control mechanisms.

Fig. 3 is a diagrammatic view showing the hydraulic operating and control circuits of the machine and their relationship to the mechanical elements of the machine.

Fig. 4 is a horizontal sectional view of the head showing details of a modified form of the control mechanism.

Fig. 5 is a horizontal sectional view of the tool head taken along the line 5—5 of Fig. 2.

Fig. 6 is a sectional view of the head taken in the same plane as Fig. 2 but showing the controls positioned for effecting movement of the tool head toward the work support.

Fig. 7 is a sectional view similar to Fig. 5 showing the positions of the controls for effecting a return movement of the tool head.

Fig. 8 is a sectional view of the by-pass valve.

For purposes of illustration the invention has been shown and will be described herein as incorporated in a single spindle vertical drilling machine, but it is to be understood that the invention may be applied to other types of drilling machines as well as to other machine tools having similar operating characteristics. It is also to be understood that various changes, modifications and adaptations may be made in the form, construction and arrangement of the parts without departing from the spirit and scope of the invention as expressed in the appended claims.

In carrying out the invention, I provide a stationary support 8 and a translatable support 9 suitably guided for movement toward and from the stationary support for the purpose of bringing a cutting tool T and a workpiece W into operative relationship. One of the supports, preferably the translatable support, is arranged to carry the cutting tool while the other support carries the work to be operated on by the tool. Instead of rigidly mounting the tool upon its associated support as is customary in the case of machine tools of the shiftable head type, I support the tool on a carrier 10 (Fig. 2) which is mounted on the support for limited movement relative thereto either toward or from the work.

Manually operable means is provided for imparting such movements to the carrier for the purpose of rapidly approaching the tool to the work, feeding it into the work, and rapidly withdrawing it from the work, and the movements of the carrier are further utilized to control power actuated mechanism, indicated generally at 11, for imparting corresponding movements to the translatable support. Thus relatively little manual effort is required to effect the rapid approach and return movements of the support and, while the force required to feed the tool to the work is applied manually, the support which carries the tool is shifted by power means. As a result the feed is extremely sensitive even though the machine is ruggedly built to adapt it for heavy-duty production work. Means is also provided for temporarily disabling the manual feed mechanism and for transferring the feeding operation to the power actuated mechanism under automatic control when it is desired to use the machine for heavy-duty work.

Referring now to Fig. 1 of the drawings, the machine selected to illustrate the invention is a vertical drilling machine having a rigid base or frame structure comprising an upright column 12 supported on a platform 13 and terminating at its upper end in a forwardly projecting head frame 14. The tool support 9, as herein shown, is supported and guided for reciprocation in a vertical plane by ways 15 on the front face of the column. The work support 8 is adjustably mounted on the ways 15 below the tool support 9. Positioning of the work support is effected through the medium of an adjustable standard 16 which may be of conventional construction.

In the particular machine illustrated, the tool support comprises a hollow generally rectangular head having parallel bearing surfaces 20 (Fig. 5) formed on its rear wall for engagement with the ways 15. Clamping plates 21 bolted or otherwise rigidly secured to the head coact with laterally projecting flanges 22 on the column to hold the head securely on the ways.

To support the carrier 10 for movement in a path parallel to the guideway, a pair of relatively long vertically spaced bearings 21' and 22' are provided on the head. As herein shown, these bearings are formed respectively in bosses 23 and 24 integral with or rigidly attached to the bottom and top walls of the head. The carrier may be keyed to the upper bearing as indicated at 25 (Fig. 2) to prevent rotation of the same while permitting endwise sliding movement in the bearings.

The carrier 10 is preferably constructed in the form of a tubular quill of sufficient length to project at each end beyond the bearing bosses 23 and 24. Collars 26 and 27 rigidly secured to the projecting ends of the quill coact with the outer ends of the bosses to limit the movements of the quill to a relatively narrow range. Spring pressed plungers 28 mounted on the respective collars and positioned to bear against the top and bottom walls of the head yieldably hold the quill in a predetermined position with respect to the head. Adjustable stop nuts 29 limit the movements of the plungers under the action of their springs and thus determine the position in which the plungers hold the quill. The use of the stop nuts makes it unnecessary to balance the springs and insures accurate positioning of the quill. In practice, the nuts are adjusted so that the quill is held in a neutral or approximately central position with substantially the same clearance between each of the collars and the head. Accordingly the quill may be moved in either direction from that position to advance it or retract it from the work as desired.

Projecting through the quill and suitably journaled therein is a spindle 30 provided at its lower end with a chuck 31 for holding the tool T, herein shown as a drill. The spindle is rotatably driven by a motor M, preferably of the reversible type, through a conventional transmission enclosed in the head frame 14. A splined connection 32 between the spindle and the transmission enables the spindle to reciprocate with the head and quill without interrupting the driving connection.

As stated heretofore, manually operable feed mechanism is provided for moving the carrier or quill 10 relative to the head to feed the tool into or to withdraw it from the work. This mechanism in its preferred form, as shown in Fig. 5, comprises a headed stud 35 journaled in the tool head for rotation about an axis perpendicular to the axis of the quill. An eccentrically disposed pin 36 projects forwardly from the head of the stud and engages in a peripheral groove in the quill whereby rotation of the stud is effective to shift the quill longitudinally against the action of the plungers 28. A hand lever 37 fast on the outer end of the stud provides convenient means for manually actuating the feed mechanism.

The movements of the quill are utilized to control the movements of the tool head by power means. This power means, as herein shown, comprises a pressure fluid motor or actuator including a vertically disposed cylinder 40 rigid with the head. The cylinder is fitted with a piston 41 which is anchored to the head frame 14 by a piston rod 42. Cylinder heads 43 and 44 close the ends of the cylinder, the latter being apertured for accommodation of the piston rod and having the usual packing gland 45 to prevent leakage of fluid around the rod.

Pressure fluid is supplied to the actuator cylinder by a pump P (Fig. 3) of any suitable type driven by a motor M1. The pump draws fluid from a reservoir or sump R and discharges it through a supply pipe 46 leading to a control valve V adapted to direct the fluid either through a pipe 47 to the upper end of the cylinder or through a pipe 48 to the lower end of the cylinder as required. The valve in either instance connects the exhaust end of the cylinder to a drain 49 which returns the exhausted fluid to the reservoir. A relief valve 50 which may be of any preferred type is connected with the supply pipe 46 to determine the maximum pressure of the fluid supply.

The control valve V, as shown in Figs. 2, 6 and 7, is a spool type valve having a shiftable member or plunger 51 enclosed within a housing 52 mounted within the tool head 9 with its axis parallel to the axis of the quill 10. When the machine is operated with manual feed, the valve plunger is shifted as an incident to the movements of the quill relative to the head. For this purpose the plunger 51 is provided with a stem 53 which extends upwardly through an aperture in an extension 54 of the collar 27. The stem is yieldably anchored to the extension by means of a stop nut 55 threaded thereon for engagement with the underside of the extension and a compression spring 56 interposed between the upper surface of the extension and a collar 57 rigid with the end of the rod. This connection acts to maintain the valve stem relatively fixed with respect to the quill so that the valve plunger normally follows the movements of the quill. The spring, however, permits the valve to move independently of the quill when required.

As will be seen by reference to Fig. 2, the plunger 51 is formed with a pair of lands 51' and 51'' cooperating respectively with outlet ports 58 and 59 in the housing 52. The supply pipe 46 is brought into the housing between the outlet ports, that is, intermediate the lands of the valve plunger, and the exhaust or drain line 49 connects with both ends of the housing thus tending to maintain the plunger hydraulically balanced. The width of the lands 51' and 51'' and their spacing is such that limited communications between the supply pipe and the exhaust line is provided through the ports 58 and 59 when the plunger is substantially centered in the housing. Movement of the plunger in either direction from this position varies the relative areas of communications between the ports and the pressure and exhaust lines thereby correspondingly varying the pressure in these ports and the lines 47 and 48 leading to the upper and lower ends of the cylinder 40. Thus, when the plunger is shifted downwardly toward the position shown in Fig. 6, the pressure inlet area of the port 59 is increased and its outlet area is decreased with a resultant increase in pressure of the fluid supplied to the lower end of the cylinder. At the same time, the pressure inlet area of the port 58 is decreased and the outlet area is increased thereby reducing the pressure of the fluid acting on the upper end of the cylinder.

Under these conditions, the cylinder and head 9 is moved downwardly at a rate determined by the difference in pressure applied to the respective ends of the cylinder. Movement of the valve plunger in the opposite direction, that is, upwardly toward the position shown in Fig. 7, reverses the pressure conditions and effects upward movement of the cylinder and head.

In practice the parts are adjusted so that the valve plunger is disposed in what may be called the neutral position when the quill is centered in the head. In this position the plunger proportions the inlet and outlet areas of the ports so as to counterbalance the weight of the head and to compensate for the difference in the effective areas on the upper and lower ends of the piston 41 whereby the head is held stationary. When the quill is moved downwardly, the valve plunger is shifted in the same direction to increase the pressure of the fluid supplied to the lower end of the cylinder 40 thus causing the tool head to be moved in the direction in which the quill has been displaced. Movement of the quill upwardly from its central position displaces the valve plunger correspondingly to increase the pressure of the fluid supplied through the pipe 47 to the upper end of the cylinder 40 thus initiating upward movement of the tool head.

Since movements of the actuator are effected by control of pressure rather than by mere opening and closing of valve ports, control of such movements is extremely accurate and sensitive. The actuator responds instantly to any displacement of the valve plunger following up such movements so as to maintain the proper balance of pressure in the actuator cylinder. The valve plunger itself is hydraulically balanced and is therefore freely movable with the quill. The rate at which the head is moved is controlled by the extent to which the pressures in the ends of the cylinders are unbalanced as determined by the action of the valve plunger on the ports 58 and 59, or in other words, by the distance the valve plunger is shifted from neutral position. Accordingly, rapid approach or return movements can be obtained by simply rocking the hand lever 37 through a relatively large angle in an appropriate direction. Engagement of the work by the tool tends to shift the quill and valve plunger back to neutral position thereby slowing down or stopping the head with a minimum shock to the tool. The actual feeding of the tool into the work is then effected by manipulation of the hand lever. Substantially all of the force applied to the lever is transmitted to the tool except the relatively small portion required to displace the quill 10 from its central position against the action of one of the springs 28. No manual effort is required to move the head structure, such movements being effected by the power mechanism in response to the manipulation of the hand lever 37 to shift the quill.

The power movements of the head thus serve merely to cause the head to follow the movements of the quill. Engagement of the tool with the workpiece tends to shift the quill back to its central position rocking the hand lever back to its central stop position and operation of the machine is terminated unless further force is applied manually to the hand lever tending to force the tool through the work. The operator is therefore able to judge the amount of feed pressure with which the tool is being driven into the work and to regulate this pressure as required by the particular work being done.

The novel feed arrangement above described also renders the machine particularly suitable for tapping. In practice, the tap is started by manually feeding it into the work and thereafter the lead of the tap tends to draw the quill downwardly and the head follows automatically in the manner previously described. Upon reversal of the spindle driving motor, the tap is backed out of the work, thus displacing the quill upwardly and causing the head to move in the same direction under the influence of its power driving means. The resistance offered to the withdrawal of the tap is reduced to a minimum thus eliminating any danger of stripping the threads.

Means is also provided for switching over from manual to automatic control if desired and to provide power feed when the machine is used for heavy-duty drilling or the like. This means comprises control mechanism operable to actuate the main valve V independently of the movements of the quill relative to the head together with auxiliary control means operative to regulate the rate and direction of movement of the head and thus enable the machine to operate through a complete cycle including rapid approach, feed and rapid return movements without requiring constant supervision by the operator.

Referring to Figs. 1, 2, and 5 of the drawings, the power feed control mechanism in its preferred form comprises a push-rod 60 extending transversely of the head from front to rear. The push-rod is supported and guided for endwise sliding movement by suitable bearings in the front and rear walls of the head and in rigid bearing members 60' and 61' projecting inwardly from a side wall of the head as best shown in Fig. 5. Suitable gripping means such as a knob 61 is provided on the front end of the rod for convenience in shifting the same. Fixed on the rod intermediate its ends, preferably within the head 9, is an elongated cam member 62 having its lower edge recessed to define spaced cam surfaces 62' and 62'' (Fig. 2) adapted to coact alternatively with a follower roller 63 carried by an arm 64 rigid with and projecting radially from the valve stem 53.

Suitable means is provided for yieldably holding the push-rod 60 and cam member 62 in a neutral position in which the cam surfaces 62' and 62'' are disposed on opposite sides of the follower roller 63 as shown in Fig. 2. This means preferably comprises a compression spring 63' encircling the push-rod and interposed between the bearing member 61' and a collar 64' loosely mounted on the rod and adapted to abut against a shoulder formed by an enlarged bearing section 65' of the push-rod. The collar 64' is also adapted to coact with the bearing member 60' to limit the forward movement of the push-rod under the influence of the spring. A second compression spring 66' which is substantially weaker than the spring 63' is interposed between the front wall of the head and the adjacent end of the cam member 62 to urge the push rod rearwardly to the limit position defined by the collar 64' and bearing member 60'. It will be apparent, therefore that the valve stem 53 will be shifted downwardly against the force of the spring 56 when the rod 60 is pushed either forwardly or rearwardly from its normal set position. In the preferred form illustrated, the cam surfaces 62' and 62'' are suitably positioned so as to displace the valve plunger sufficiently to completely close the outlet area of the port 59 and to similarly close the inlet area of the port 58 as shown in Fig. 6. Moreover, the cam surface 62' is arranged to hold the valve in the operated position during further movement of the rod to its extreme rearward position. The valve V is thus set in a position to effect a positive downward movement of the head 9 without regard to the position of the quill 10.

The cam 62 is also utilized to actuate auxiliary valve means for regulating the rate of movement of the head. This valve means as herein shown includes a metering valve VI connected in the supply line 47 leading to the upper end of the cylinder 40 and normally by-passed by a valve V2. Both valves are conveniently enclosed within the head structure and the latter is arranged for cooperation with the cam 62 as will appear presently.

The by-pass valve V2, as shown in Fig. 8, comprises a plunger 65 slidable within a suitable casing and normally held in an open position by a spring 66 so as to provide a substantially unrestricted passage for fluid flowing through the line 47. The valve plunger is arranged to be shifted to a closed position to cut off flow through the line 47 by an operating member in the form of a lever 67 pivoted on the valve casing. A follower roller 68 on the free end of the lever is positioned for engagement by one or the other of the cam surfaces 62′ and 62″ when the push-rod 60 is shifted to either its forward or extreme rearward position. In the rearward movement of the push-rod, the control valve V is shifted to operated position before the by-pass valve is operated thus providing for the rapid traverse of the head followed by a slower feeding movement thereof. Upon forward movement of the push-rod, the by-pass valve is operated before the main valve is shifted thus limiting the movements of the head to a feeding rate. This is advantageous when the tool is initially positioned so close to the work that rapid traverse movement of the head is undesirable.

Closure of the by-pass valve diverts the fluid flow from the cylinder 40 through the metering valve VI which restricts the flow to the extent necessary to produce the desired rate of movement of the head for feeding purposes. The metering valve may be of any preferred type and as herein shown comprises a rotary member 69 (Fig. 6) seated in a conventional casing and having suitable radially opening orifices cooperating with a tapered passage 70 in the valve casing. An adjusting knob 71 (Figs. 1 and 5) fast on the valve member and accessible from the outside of the head 9 provides convenient means for adjusting the area of the flow orifice and thus regulating the slow feed rate of the head.

The push-rod 60 is used for control purposes when the machine is to be operated in an automatic cycle or in heavy-duty operation. To initiate an automatic cycle, the rod is manually shifted rearwardly to its intermediate or rapid approach position. To retain it in such position and to shift it to the feed position at the proper time, the rod is provided with a follower roller 74 adapted to coact with suitably shaped cam means stationarily mounted on the machine column. The cam means as herein shown comprises a fixed cam section 75 (Figs. 1 and 2) and an adjustable cam section 76 arranged to present a pair of laterally spaced parallel cam surfaces with an inclined surface 77 leading from one to the other, the spaced cam surfaces being parallel to the guideway 15, that is, parallel to the reciprocatory path of the head 9.

The cam section 75 is preferably disposed so that the rod 60 and cam 62 are held in an intermediate position in which the cam surface 62′ is effective to actuate only the valve V, thus leaving the by-pass valve open for unrestricted flow of fluid from the cylinder 40 whereby the head 9 may be advanced rapidly toward the work. The main surface of the cam section 76 is disposed rearwardly of the cam section 75 so that the push-rod is shifted to its extreme rearward position as the roller 74 rides over the surface 77 and the rod is held in the extreme position until the follower passes over the lower end of the cam section. In the extreme rearward position of the rod, by-pass valve V2 is closed by the cam surface 62′ and metering valve VI is rendered effective to control the flow of fluid from the cylinder 40 and thus determine the feeding rate of the head. This rate may be varied as desired by the manual setting of the metering valve. In order to effect the automatic return of the head, it is therefore desirable to provide suitable means for moving the quill toward the return position when the machine is operated in an automatic cycle. The means provided for this purpose in the exemplary machine, as shown in Fig. 2, comprises a compression spring 78 set in a recess in the underside of the quill collar 27 and engageable with the upper wall of the head. A thumb screw 79 threaded into the collar is provided for adjusting the spring. Thus, when the machine is to cycle automatically, the thumb screw is turned down until the force exerted by the spring 78 is sufficient to overcome the force of the spring 28 and to shift the quill upwardly with respect to the head. For manual operation, the pressure of the spring 78 is relieved to allow springs 28 to center the quill as above described.

When the follower roller leaves the lower end of the cam section 76, spring 63′ returns the push-rod to its neutral position, thereby again placing valve V under control of the quill. Since the quill is urged upwardly from the central position by the spring 78, release of the valve from the control of cam 62 results in the instant shifting of the valve to its upper or return position by the spring 56. Movement of the head is accordingly reversed. As the head approaches the fully retracted position, valve stem 53 engages an adjustable stop 80 on the head frame and control valve V is thereby shifted to the neutral position to interrupt further movement of the head.

When it is desired to employ power feed without automatic cycling, the rod 60 is pulled forwardly so that the cam surface 62″ performs the valve controlling functions performed in the automatic cycle by cam surface 62′. In this instance, however, the by-pass valve V2 is closed before the control valve V is shifted to its operated position and consequently the head is driven downwardly at a feeding rate. Feeding movement continues only while the rod 60 is manually held in its actuated position and, upon release of the rod, spring 66′ returns it to neutral position thereby placing the valve under control of the quill. The tool is accordingly backed off sufficiently to allow the quill to become centered in the head.

Fig. 4 of the drawings illustrates a modified form of the control mechanism which enables the machine operation to be interrupted at any desired point in the automatic cycle. In this form of the mechanism, the cam 62 instead of being rigid with the push-rod 60 is slidably mounted thereon. A compression spring 81 interposed between the forward end of the cam member and a collar 82 fast on the rod urges the member against a shoulder formed by an enlarged section 88 of the rod. The cam member is thus yieldably held in a fixed position with respect to the rod but is movable in one direction from such positions by means of a hand lever 84 projecting laterally through the side wall of the head. Thus, when the push-rod 60 is being held in operated position by either cam 75 or 76, cam member 62 may be shifted manually to a position in which the valve V is released to the control of the quill. The head can then be retracted by appropriate manipulation of the hand lever 87 and the cam member 62 is reset by the spring 81.

It will be apparent from the foregoing that the invention provides a machine tool of novel and advantageous construction in which a cutting tool may be fed to the work either manually or by power as best suits the character of the work to be done. Moreover, this may be operated in a fully automatic cycle if desired. The manually applied force required to feed the tool into the work is reduced to a minimum by reason of the novel arrangement for shifting the tool supporting head by power in synchronism with the manual feed of the tool. As a result the manual feed is extremely sensitive and the operator is enabled to judge very accurately the amount of pressure with which the tool is being driven into the work and to make appropriate adjustments to meet the conditions obtaining at any time. Rapid movements may be effected for advancing the tool to the working position or for retracting it therefrom with a minimum effort on the part of the operator and under constant, accurate control. A high degree of accuracy is assured by reason of the fact that the tool carrier or quill is projected from the head only a very small amount thus providing adequate bearing support for the same under all operating conditions.

I claim as my invention:

1. A machine tool having, in combination, a translatable head, a hydraulic actuator arranged to translate said head, valve means controlling the supply of pressure fluid to said actuator to determine the direction of movement of the head, said valve having a neutral position in which the supply of pressure fluid to the actuator is regulated so as to hold the head stationary, a tool carrying member mounted on said head for movement relative thereto in a path parallel to the translatory path of the head, spring means acting on said member tending to yieldably hold the member in a central position, feed mechanism on said head manually operable to move said member in either direction from said central position, and means operatively connecting said member with said valve means, said connecting means being effective to set the valve means in neutral position when the member is in its central position and to shift the valve into a position to cause the head to follow the movements of the member in either direction.

2. A machine tool having, in combination with a work support, a tool supporting structure comprising a head mounted for movement toward and from said work support, power means for actuating said head, a carrier mounted on said head for movement therewith toward and from said work support and also mounted for limited shifting movement relative to the head, a spindle mounted on said carrier and adapted to support a cutting tool, means whereby said carrier may be shifted relative to said head either toward or away from said work support, and means controlling said power operated means for causing said head to move toward or from the work support, said control means including a control device operative automatically as an incident to the shifting of the carrier to feed the cutting tool into engagement with the work or to withdraw it therefrom, said device being adapted when the carrier is shifted in one direction or the other to cause the head to be moved by said power operated means in a corresponding direction.

3. In a machine tool having tool and work supports one of which is movable toward and from the other, the combination of power driven means for shifting the movable support, a tool carrying member mounted on said tool support for movement relative thereto in a direction parallel to the path of the movable support, means yieldably holding said member in a predetermined position with respect to the tool support, manual feeding means on the tool support operable to move the tool carrying member from said predetermined position either toward or from the work support, and a control device operable in response to the movements of the tool carrying member to cause said power driven means to shift the movable support toward or from the other in accordance with the direction of movement of said member.

4. A machine tool having, in combination, a translatable head, power actuated means for translating said head, a tool carrying member mounted on said head for movement relative thereto toward or from a workpiece, yieldable means tending to hold said member in a predetermined position with respect to the head, actuator means operable to move said member from said predetermined position to advance or retract the tool with respect to the workpiece, and control means operative in response to the movement of said member for causing said power actuated means to shift the head in the direction in which the member is moved.

5. A machine tool having, in combination, a work support and a tool support mounted for relative movement toward and from each other, a tool supporting quill mounted on the tool support and shiftable relative thereto in the direction of the work support, a hydraulic actuator associated with one of said supports and operative to move it toward and from the other support, a valve for controlling the direction of movement of the movable support by said actuator, means for shifting the quill in either direction relative to the tool support, and means operative as an incident to the shifting of said quill in one direction or the other to actuate said valve whereby to cause movement of the movable support by said power means in one direction or the other.

6. A machine tool having, in combination, a work support, a base, and a tool supporting structure comprising a head mounted for movement on said base toward and from the work support, a rotatably driven tool spindle mounted on said head and shiftable relative thereto, shifting means for said spindle operable manually for applying the sole force to feed a cutting tool thereon relative to the work, and power actuated means responsive to the shifting movement of said spindle in one direction relative to the head to impart a corresponding movement to the head.

7. A machine tool comprising, in combination, a work support and a tool support mounted for relative movement toward and from each other, said tool support having a tool spindle, a quill rotatably supporting said spindle and shiftable relative to the tool support in a direction toward or from the work support, power means for moving one of said supports relative to the other, and means responsive to a shifting of the quill relative to the tool support for initiating relative approaching or receding movements of said supports by said power means.

8. A machine tool having, in combination, a work support, a head shiftable toward and from the work support, a tool carrier mounted on said head for movement toward and from a workpiece carried by the work support, said carrier being adapted to hold a rotatably driven cutting tool in a position to operate upon the workpiece, means yieldably holding said carrier in a predetermined position with respect to the head, carrier actuating means operable manually to move said carrier from said predetermined position so as to feed the tool into the workpiece or to retract it therefrom, and power actuated means operative in response to the feeding of the tool to simultaneously advance said head in a direction tending to maintain the predetermined positional relationship between the head and the carrier during the feed of the tool.

9. A machine tool having, in combination, a work support, a tool support, a tool carrying member mounted on said tool support for movement relative thereto, manually operable means for imparting movements to the member to feed the tool carried thereby to a workpiece or to retract the tool, power actuated means controlled by the movements of said member relative to its support for causing the head to follow the movements of the member, and means operative to condition said power actuated means to feed and retract the tool carrying member independently of said manually operable means.

10. A machine tool having, in combination, a translatable member, a tool carrying member supported on said translatable member for movement relative thereto, means operable manually for shifting said tool carrying member relative to the translatable member, power actuated means operative in response to shifting of the tool carrying member in either direction for moving said translatable member in a corresponding direction, and other control means operable to condition said power actuated means for moving the translatable member independently of control by the tool carrying member.

11. A machine tool having, in combination, a translatable head, a tool carrying member mounted on said head for movement relative thereto, means carried by said head and operable manually to move said member toward or from a workpiece, power actuated means for moving said head, control means actuated in response to the movement of the tool carrying member in either direction to condition said power actuated means for moving the head in a corresponding direction, means operable manually to actuate said control means independently of the tool carrying member and thereby initiate movement of the head by said power actuated means, and means operative in response to the movements of the head for further actuating said control means to regulate the rate of movement of the head.

12. A machine tool having, in combination, a work support, a tool support shiftable toward and from the work support, a hydraulic actuator operative to shift said tool support, a tool carrying member mounted on said tool support for movement relative thereto, feed mechanism operable manually to move said member toward or from the work support, valve means normally actuated in response to the movements of said member to direct pressure fluid to said actuator for shifting the tool support in synchronism with the movement of the member, and control means operable to actuate said valve independently of said member to direct pressure fluid to said actuator for shifting the tool support.

13. In a machine tool, in combination, a work support, a tool head supported for movement toward and from the work support, power actuated means for moving said head, said head having a tool carrier mounted thereon for independent movement toward or from the work support, feed mechanism operable manually to move said carrier relative to the head, a control device operable in response to the movement of the carrier in either direction to condition said power actuated means for moving the head in a corresponding direction, control means operable manually to actuate said device to condition said power actuated means for moving the head in one direction independent of any movements of the carrier, and means operative to maintain the device in the actuated position during the movement of the head through a predetermined range, said device being released to the control of said carrier upon movement of the head beyond said predetermined range.

14. In a machine tool, in combination, a work support, a tool head supported for movement toward and from the work support, a pressure fluid operated actuator for moving said head, a tool carrier mounted on said head for movement relative thereto either toward or from the work support, means yieldably holding said carrier in a predetermined position with respect to the head, feed mechanism operable manually to move said carrier from said predetermined position, valve means operable in response to the movement of the carrier in either direction to direct pressure fluid to said actuator for moving the head in a corresponding direction, control means operable manually to set said valve in a position to effect movement of the head in a selected direction independently of any movements of the carrier, and means operative to hold said control means in operated position until the head has moved through a predetermined distance, said valve being actuated to a position to reverse the direction of movement of the head under the control of said carrier in response to the movement of the head beyond said predetermined distance.

15. In a machine tool, in combination, a work support, a tool head supported for movement toward and from the work support, a pressure fluid operated actuator for moving the head, a tool carrier mounted on said head for movement relative thereto, means yieldably holding said carrier in a predetermined position with respect to the head whereby the carrier may be moved either toward or from the work support, feed mechanisms operable manually to move said carrier from said predetermined position, a main control valve operable in response to the movements of the carrier in either direction for directing pressure fluid to said actuator to move the head in a corresponding direction, an auxiliary valve operable to regulate the rate of movement of the head, control means shiftable manually to a position effective to set said main valve for initiating movement of the head in a selected direction independently of any movements of said carrier, cam means for maintaining said control means in said shifted position during the movement of the head through a predetermined distance, and other cam means operative incident to the movement of the head for shifting said control means to a position effective to actuate said auxiliary valve and thereby change the rate of movement of the head.

16. A machine tool having, in combination, means for supporting a workpiece, a head supported for movement toward and from the workpiece, a quill mounted on said head for movement relative thereto in a direction parallel to the path of movement of the head, a rotatably driven tool carrying spindle journaled in said quill and movable therewith, stop means on said quill positioned to coact with the head to confine the movements of the quill within predetermined limits, means normally effective to yieldably maintain said quill substantially centered with respect to said limit positions, and feed mechanism operable to shift said quill in either direction from said centered position.

17. A machine tool having, in combination, means for supporting a workpiece, a head supported for movement toward and from the workpiece, an elongated member extending through said head and slidably supported thereon for independent movement toward and from the workpiece, a rotatably driven tool supporting spindle journaled in said member and movable therewith, said member projecting from the head at each end, collars secured to the projecting ends of said member and positioned to coact with the head to limit the movements of the member relative thereto, a spring pressed plunger carried by each of said collars arranged to engage the head and yieldably hold the member in a predetermined position with respect to the head, and means operable manually to shift said member in either direction from said predetermined position.

18. A translatable tool head having, in combination, an elongated tool carrying member extending through the head and slidably supported thereon for independent movement in a path parallel to the translatory path of the head, said member projecting from the head at each end, shiftable spring pressed plungers carried by the projecting ends of said member disposed for engagement with the adjacent walls of the head, said plungers being positioned respectively so as to yieldably urge the head in opposite directions, and stop means acting on said plungers to limit the range of movement of the plungers and thereby effect a substantial centering of the member with respect to the head regardless of any differences in the pressure exerted by the respective plungers on the head.

19. A translatable tool head having, in combination, a tool carrier mounted on the head for movement relative thereto in a path parallel to the translatory path of the head, a pair of centering members supported on said carrier and movable into engagement with adjacent portions of the head from opposite directions, means yieldably urging said members into engagement with the head whereby each of the members tends to shift the carrier against the action of the other member, and means associated with said members for maintaining the carrier in a predetermined position regardless of any differences in the pressure with which the respective members are urged against the head.

20. A machine tool having, in combination, a tool support, a work support, a power driven actuator operable to move one of said supports relative to the other support, a tool mounted on the tool support for movement relative thereto, toward and from the work support, and control means operative in response to such movement of the tool relative to its support for controlling the operation of said power actuated means to cause said movable support to approach and retreat with respect to the other support.

21. A machine tool having, in combination, a stationary support, a support movable relative to said stationary support, a power actuator for shifting said movable support, a tool mounted on one of said supports for movement relative thereto from an intermediate position in opposite directions, and control means operative in response to such movements of the tool relative to its support for controlling the operation of said power actuated means in one direction or the other depending upon the direction of movement imparted to the tool relative to its support.

22. A machine tool having, in combination, a tool support, a work support, pressure fluid actuated means for moving one of said supports relative to the other, a valve controlling the delivery of pressure fluid to said fluid actuated means, a tool mounted on said tool support for movement relative thereto, means for imparting movements to the tool to feed it to or retract it from work held on said work support, and control means operated in response to the movements of the tool relative to its support for shifting said valve to control the direction and rate of movement of said one support by said power actuated means.

23. A machine tool having, in combination, a tool support, a work support, power actuated means operable to move one of said supports relative to the other support, a tool mounted on the tool support for movement in either of two directions from a normal position, and control means operated in response to the movement of the tool relative to its support for initiating the operation of said power actuated means, the direction of movement of the tool and the extent of its displacement from the normal position determining the direction and rate of movement of said one support by said power actuated means.

JOSEPH O. OLSEN.